(12) United States Patent
Iwao

(10) Patent No.: US 6,412,384 B1
(45) Date of Patent: Jul. 2, 2002

(54) HOLE-FORMING DEVICE

(75) Inventor: Shin Iwao, 560-1 Ota-machi, Isesaki-shi, Gunma-ken (JP)

(73) Assignees: Shin Iwao; Kabushiki Kaisha Iwazaki, both of Gunma-Ken (JP)

( * ) Notice: Subject to any disclaimer, the term of this patent is extended or adjusted under 35 U.S.C. 154(b) by 0 days.

(21) Appl. No.: 09/531,675

(22) Filed: Mar. 20, 2000

(30) Foreign Application Priority Data

Mar. 23, 1999 (JP) .......................................... 11-078410

(51) Int. Cl.[7] ................................................. B26F 1/24
(52) U.S. Cl. ........................... 83/866; 30/444; 30/448; 30/366
(58) Field of Search ................................. 220/278, 277, 220/260, 261, 262; 30/444, 448, 442, 367, 366, 368; 83/866, 868

(56) References Cited

U.S. PATENT DOCUMENTS

| | | | | |
|---|---|---|---|---|
| 1,008,226 A | * | 11/1911 | Wanlin | 30/368 |
| 1,161,684 A | * | 11/1915 | Ireland | 30/368 |
| 1,259,335 A | * | 3/1918 | Acton | 30/366 X |
| 1,689,047 A | * | 10/1928 | Packer | 30/366 |
| 2,118,593 A | * | 5/1938 | Dodelin | 220/277 X |
| 2,390,309 A | * | 12/1945 | Keys | 30/366 X |
| 2,787,178 A | * | 4/1957 | Maxim | 30/367 X |
| 2,787,179 A | * | 4/1957 | Warner | 30/367 X |
| 2,913,821 A | * | 11/1959 | Anderson | 30/444 X |
| 3,086,530 A | * | 4/1963 | Groom | 30/367 X |
| 3,349,821 A | * | 10/1967 | Moeller | 83/866 X |
| 3,382,577 A | * | 5/1968 | Rieder | 30/366 X |
| 3,791,034 A | * | 2/1974 | Carver | 30/368 X |
| 4,469,249 A | * | 9/1984 | Malpas et al. | 220/277 X |
| 4,740,257 A | * | 4/1988 | Halls et al. | 30/367 X |
| 5,144,750 A | * | 9/1992 | Mandel | 30/368 |
| 5,285,827 A | * | 2/1994 | Gonzalez-Miller et al. | 30/448 X |
| 6,223,441 B1 | * | 5/2001 | Parsons | 30/367 |

\* cited by examiner

*Primary Examiner*—Charles Goodman
(74) *Attorney, Agent, or Firm*—Lowe Hauptman; Gilman & Berner, LLP

(57) ABSTRACT

A hole-forming device includes a base member having a hole-forming projection facing a bottom of a can. The hole-forming projection is formed on an upper surface of the base member. The base member is slidable upward to the upper part of a case by pushing a pressing member. The hole-forming projection is normally held in the case for safety.

7 Claims, 10 Drawing Sheets

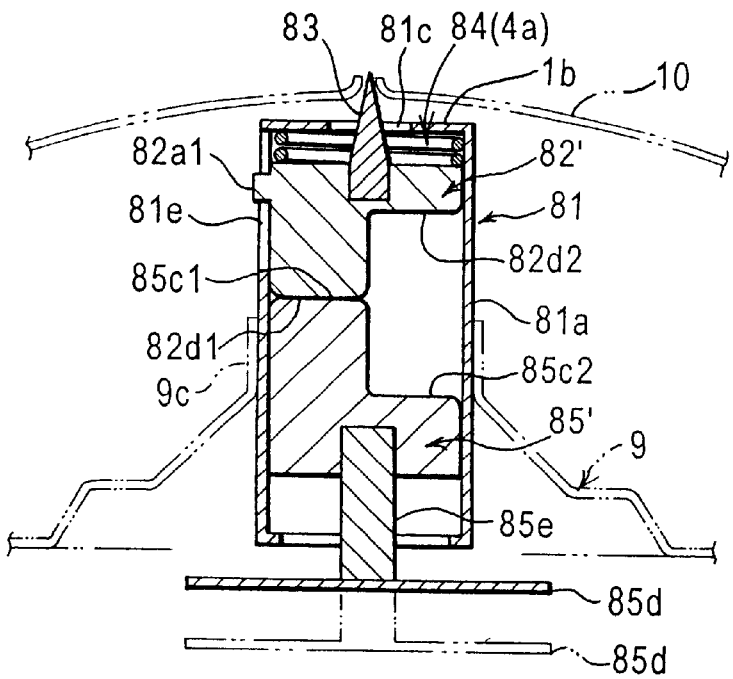
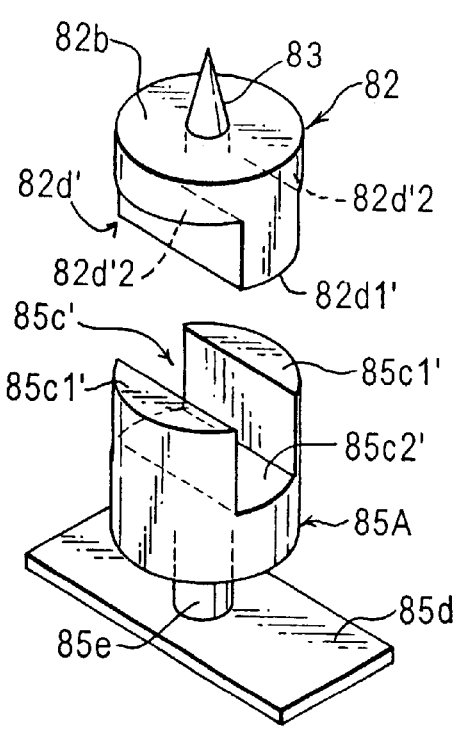
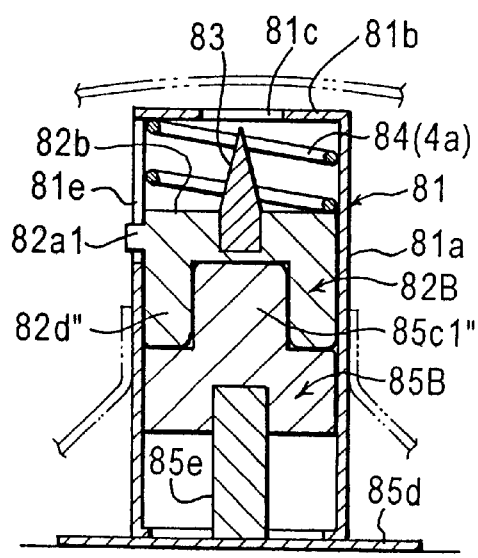

HOLE-FORMING DEVICE

BACKGROUND OF THE INVENTION

The present invention relates to a hole-forming device that allows holes to be formed in a safe and reliable manner in cans used for spraying their contents such as spray cans, gas tank cartridges for stoves, and the like. When these containers are to be discarded, these holes are formed as vent holes to release residual gas.

When discarding spray cans, gas tank cartridges for stoves, and the like, after use, residual gas inside the container may not be completely discharged. This residual gas is often left inside the container when it is discarded. This is extremely dangerous for workers during the disposal operation, and can also have a negative impact on the environment.

For these reasons, various devices have been developed to form gas venting holes in cans so that the gas in containers can be discharged. Many of these form a gas venting hole for discharging residual gas by puncturing a side surface or a bottom surface of a container using a plate material or the like having a nail, a needle, or a sharpened end. This type of device has been the most common.

As described above, many of the dedicated devices used to form gas venting holes for the discharge of gas from used containers involves a sharp end, i.e., a nail-shaped end. However, when forming holes with a nail-shaped member, the puncturing of the container with the nail-shaped member is dangerous.

In particular, since a can is cylindrical in shape, the side surface is a curved side surface. Also, the bottom surface is almost always formed as a concave spherical surface. Thus, when a tool having a nail-shaped member is to be driven to puncture a container, the end of the nail-shaped member can very easily slip along the side surface of the container if driven at an orientation that is even slightly shifted from a perpendicular orientation. This makes forming a gas-venting hole difficult.

Of course, if the end of the nail-shaped member slips when being driven in, this is also dangerous for the worker performing the operation. Thus, when forming a gas venting hole in a can using a tool having a nail-shaped member, the nail-shaped member must be kept in a fixed and stable state. Among the various hole-forming devices, almost none take this issue into consideration.

SUMMARY OF THE INVENTION

It is an object of the invention to provide a hole-forming device operable with both ease and safety.

Another important object of the present invention is to provide a hole-forming device performing hole forming in the bottom of cans without fail, which is mechanically simple.

A further object of the present invention is to provide a hole-forming device having a variety of materials applicable to the present invention, for example, metals, synthetic resin, plastics and the like, which can prepare for hole-forming with a simple operation.

An additional object of the present invention is to provide a hole-forming device relieving the shock when forming a hole in a bottom of cans.

As a result of diligent research into this problem, the present inventor has found a safe and reliable way to form gas vent holes for cans and has overcome the problems described above by providing a hole-forming device that includes a base member having a hole-forming projection on it and having a pressing member located under the base member. Both the base member and the pressing member are accommodated in a case. The pressing member slides in the case and pushes the base member towards the upper part of the case.

The present invention also provides a hole-forming device which includes a pressing portion fixing the base member roughly so that the hole-forming projection is normally accommodated in the case and having a fitting chip formed in either the base member or the pressing member. The base member is engaged with the pressing member, a part of which is taken out by way of the fitting chip (fitting chips). The pressing member pushes (presses) the base member to the upper part of the case.

Briefly stated, the present invention provides a hole-forming device which includes a base member having a pressured slope and a pressing slope. The pressured slope is formed as the lower end surface of the base member. The pressing slope is formed as the upper end surface of the pressing member. The lower end part of the pressing member sticks out from the lower end of the case by circumferential rotation of the pressing member to the base member.

Further stated, the present invention provides a hole-forming device which includes the base member having a pressured unflat surface and the pressing member having a pressing unflat surface. The pressing unflat surface is formed to put in contact with the pressured unflat surface.

According to an embodiment of the invention, there is provided a hole-forming device comprising: a case fittable to a bottom portion of a can receptacle; a base member accommodated in said case; said base member slidable along the longitudinal direction of said case; a hole-forming projection being formed on an upper surface of said base member; a pressing portion fixing roughly said base member so that said hole-forming projection is normally accommodated in said case; a pressing member placed under said base member; upper end of said pressing member being inserted in a lower part of said base member; a fitting chip formed at least in either said base member or said pressing member; and whereby said base member is engaged with said pressing member a part of which is taken out of said base member, and said base member is slidable upward to the upper part of said case by pushing said pressing member.

The above, and other objects, features and advantages of the present invention will become apparent from the following description read in conjunction with the accompanying drawings, in which like reference. numerals designate the same elements.

BRIEF DESCRIPTION OF THE DRAWINGS

FIG. 11 is a longitudinal sectional side view of the second modified second embodiment showing completed hole-forming;

FIG. 12(A) is an exploded perspective view showing only the main elements of the second modified second embodiment; and FIG. 12(B) is a longitudinal sectional side view of another variation of the second modified second embodiment ready for forming a hole in a can.

DETAILED DESCRIPTION OF THE PREFERRED EMBODIMENT

Figure 1:
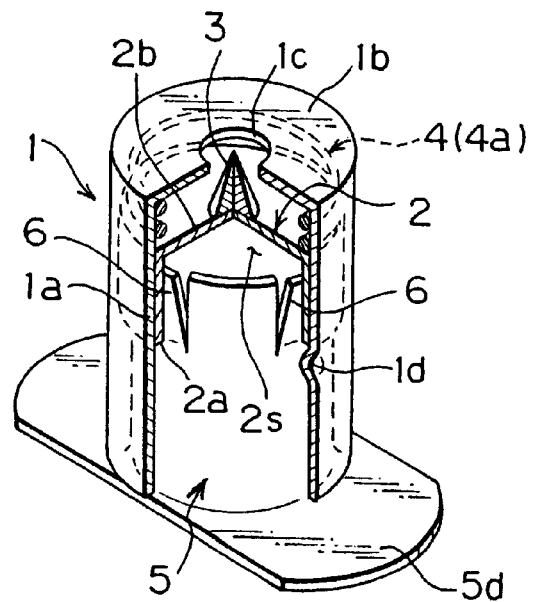
FIG. 1(A) is a partially cutaway view in perspective of a hole-forming device.
FIG. 1(B) is a partially cutaway view in perspective of a hole-forming device ready for forming a hole in a can.
Figure 1:
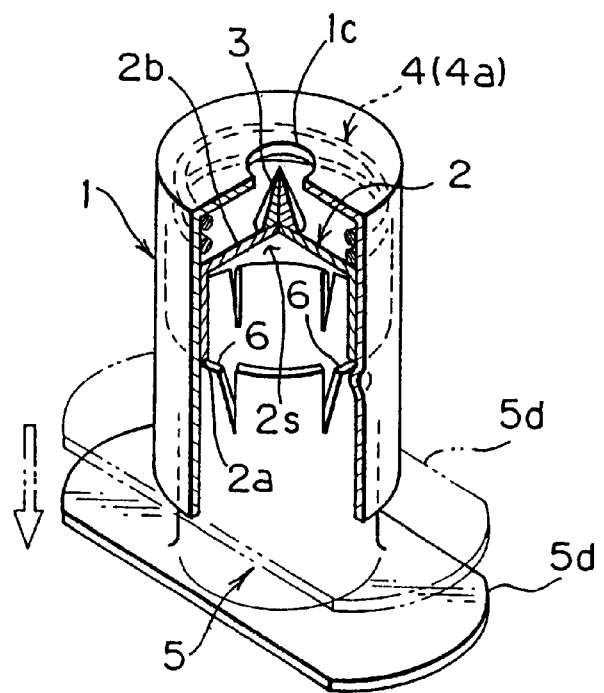
Figure 2:
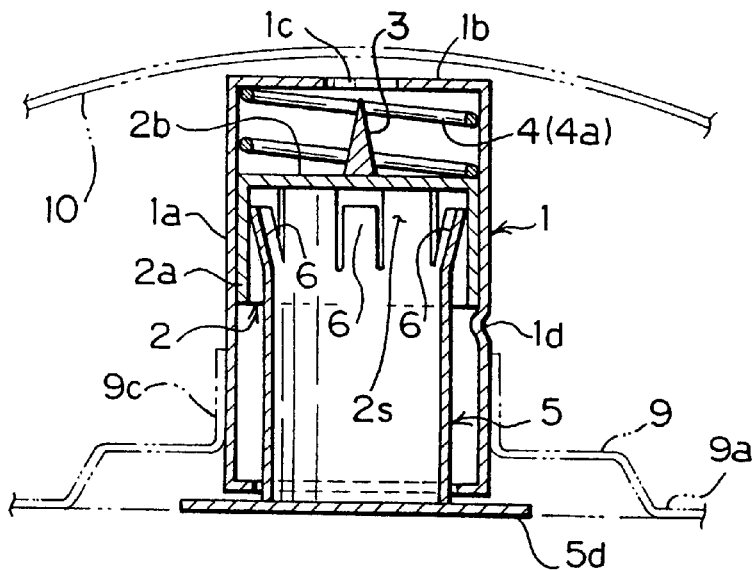
FIG. 2(A) is a longitudinal sectional view of a hole-forming device.
FIG. 2(B) is an exploded perspective view of a hole-forming device.
Figure 2:
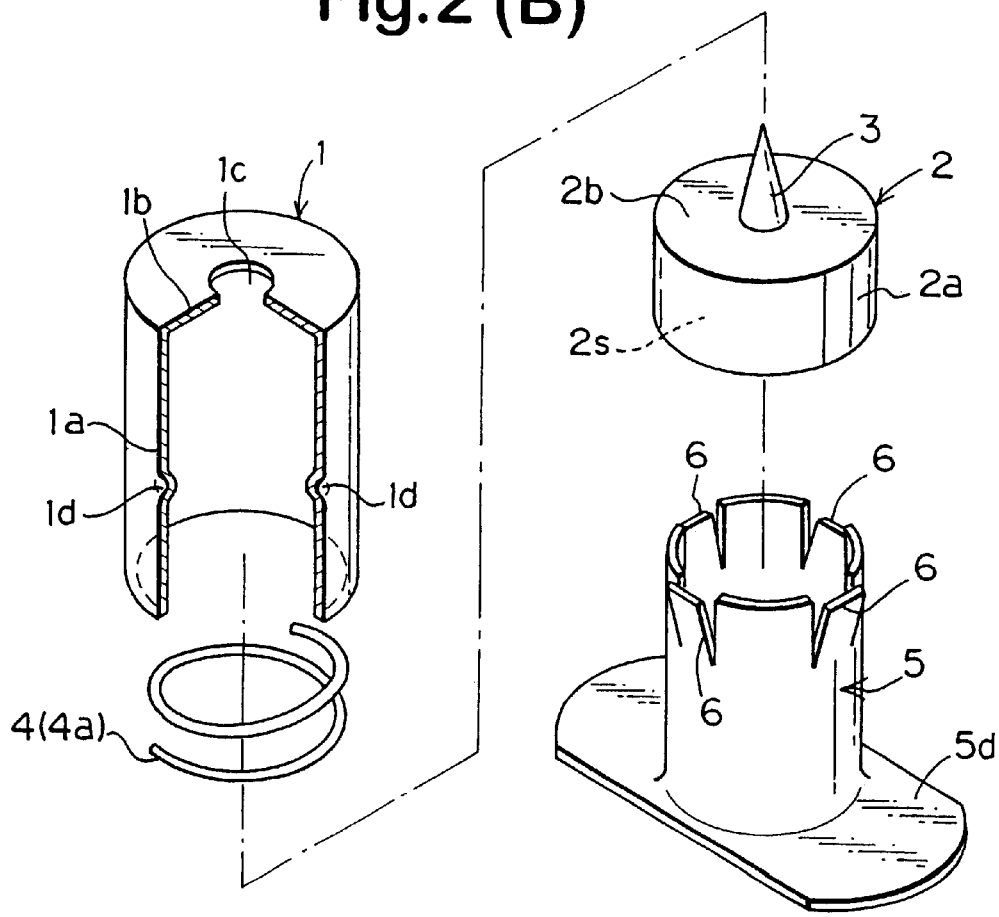
Figure 4:
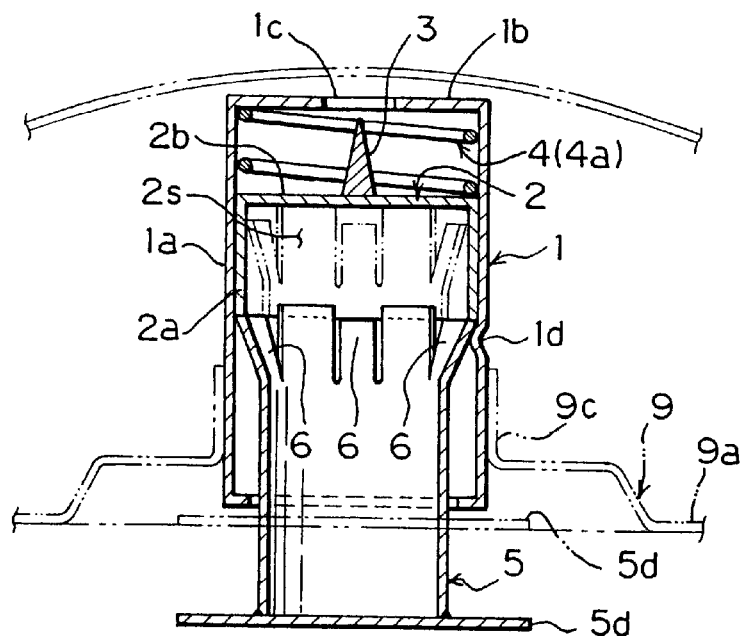
FIG. 4(A) is a longitudinal sectional side view showing a hole-forming device ready for forming a hole in a can.
FIG. 4(B) is a longitudinal sectional side view showing a hole-forming device about to form a hole in a can.
Figure 4:
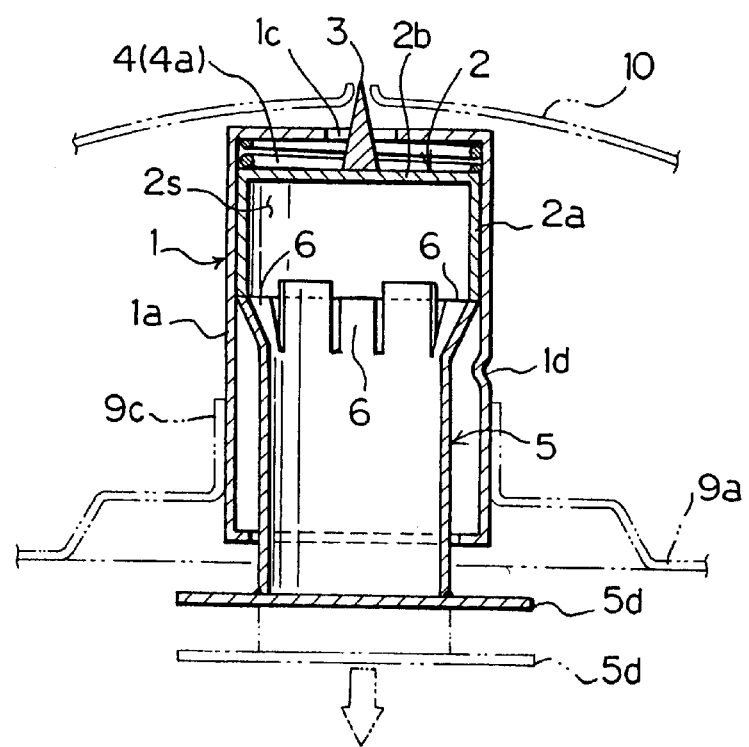

Referring to the drawings, a description will be given of the present invention. For the first embodiment of the present invention, a hole-forming device is comprised of a case 1, a base member 2, a hole-forming projection 3 and a pressing member 5 as shown in FIG. 1, FIG. 2 and the others. The case 1 is cylindrically shaped. The upper end of a circumferential wall 1a of the case 1 has a top portion 1b. A piercing hole 1c is provided at the center of the top portion 1b so that the hole-forming projection 3 can go through. As a result, as shown in FIG. 4(B), the hole-forming projection 3 goes through the piercing hole 1 c and projects out of the upper end of the case 1.

Figure 3:
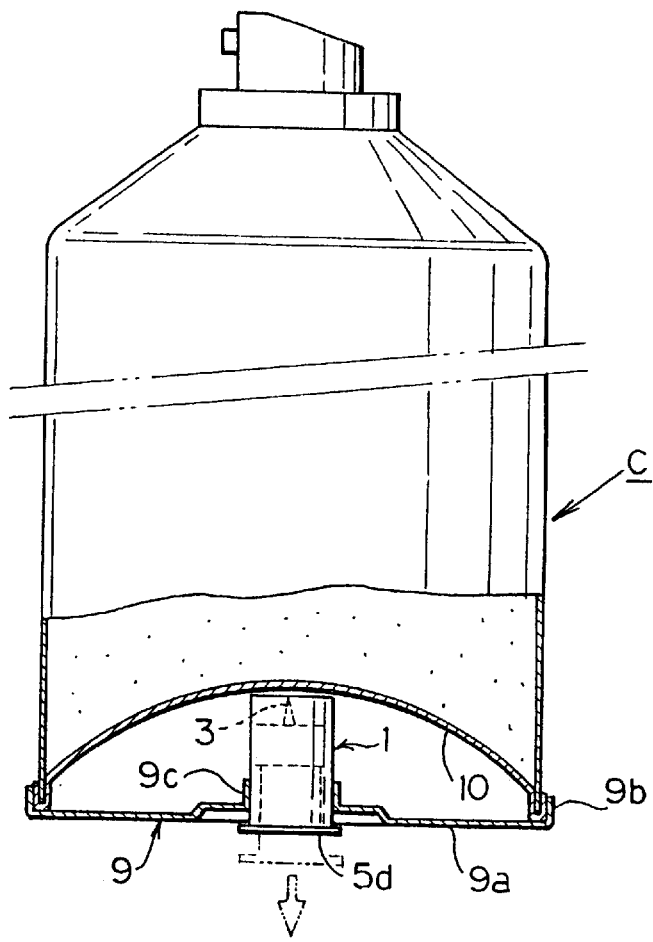
FIG. 3(A) is a partial cross sectional side view showing a hole-forming device fitted to the bottom of cans.
FIG. 3(B) is a partial cross sectional side view of a bottom of a can ready for a hole to be formed.
FIG. 3(C) is a partial cross sectional side view of a bottom of a can in which the gas is sprayed out of the hole.
Figure 3:
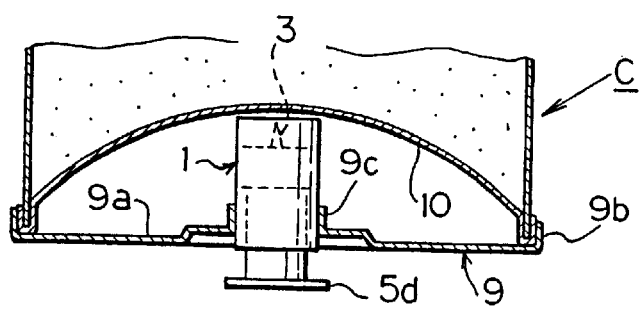
Figure 3:
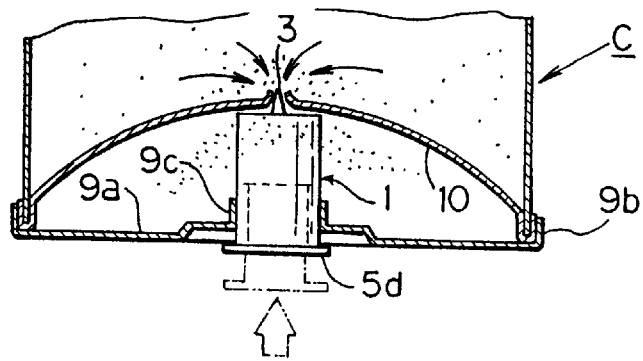

The case 1 can be fit to the bottom portion 10 of a can receptacle C, as shown in FIG. 3 (A). And the case 1 can be located at the center (including near center) of the bottom portion 10 through an installing member 9 which can be fitted freely to the bottom portion 10. The installing member 9 is comprised of a discoid 9a and a fitting portion 9b. The fitting portion 9b can be formed around the discoid 9a. The case 1 can be fitted to the can receptacle C, as shown in FIG. 3(A), so that the fitting portion 9b is fitted to the circumference of the bottom portion 10.

A case supporting portion 9c can be formed at the center of the discoid 9a. Therefore, the case 1 is supported by the case supporting portion 9c. The case supporting portion 9c can be made to hold the case 1 along the longitudinal direction of the can receptacle C. In addition, as shown in FIG. 4(B), the case supporting portion 9c can be made so that the hole-forming projection 3 can penetrate perpendicularly at the center of the bottom portion 10 of can receptacle C. The case 1 can be fixed together with the case supporting portion 9c by various means for fixing, for example, spot-welding, press-fixing, a strong adhesive and the like.

Next, the base member 2 is formed into a cylindrical shape just like a cap of a bottle. An upper portion 2b is formed on top of a sliding circumferential wall 2a. The hole-forming projection 3 can be provided on the upper portion 2b. Further, as shown in FIG. 1(A), FIG. 1(B), FIG. 4(A) and FIG. 4(B), there exists an insert space portion 2s under the base member 2. To be clear, the insert space portion 2s is a space surrounded by the sliding circumferential wall 2a and the upper portion 2b.

The base member 2 can be accommodated in the case 1 so as to be slidable along the longitudinal direction of the case 1. A pressing portion 4 can be provided between the top portion 1b (FIG. 2A) of the case 1 and the upper portion 2b of the base member 2. The pressing portion 4, as shown in FIG. 2(A), should normally be accommodated in the case 1 so that the hole-forming projection 3 wouldn't project out of the piercing hole 1c unnecessarily. It is preferable that the hole-forming projection 3 can project out of the piercing hole 1c only in case of necessity.

To be clear, a coiled spring 4a can be used for the pressing portion 4 as shown in FIG. 2(A) and 2(B). The upper portion 2b of the base member 2 can be pressed elastically downward to the lower part of the case 1.

Figure 7:
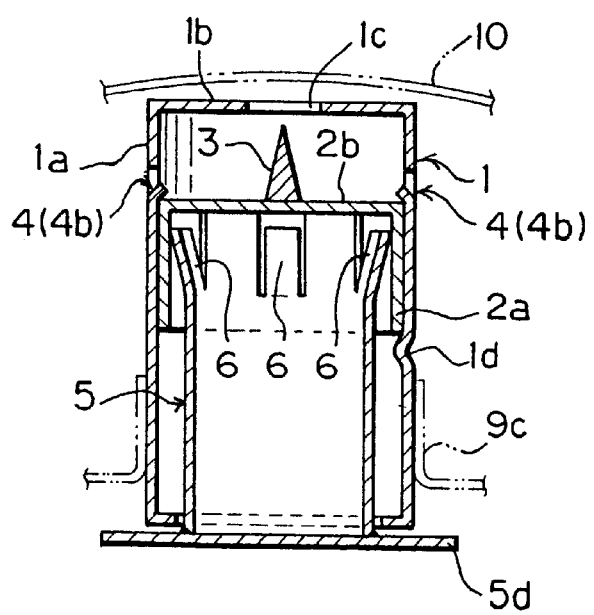
FIG. 7 is a longitudinal sectional side view of a hole-forming device whose pressing portion is formed as a projection.

The pressing portion 4 can be a stopping projection 4b projecting from the circumferential wall 1a of the case 1 to the inside of the case 1 as shown in FIG. 7. One or more stopping projections 4b can be provided and should be easily broken by pressure.

The stopping projection 4b holds the upper portion 2b of the base member 2 and the hole-forming projection 3 is held to be usually accommodated in the case 1. Further, when the base member 2 moves upwards to the upper part of the case 1 by pressing the pressing member 5, the stopping projection 4b is broken and the hole-forming projection 3 is projected out of the top surface of the case 1. Another modified stopping projection 4b can be made in such a manner as to be formed as a small protruding portion which protrudes slightly to the inside of the case (not shown in Figures).

Next, the pressing member 5 can be cylindrical in shape (including near cylindrical). The upper part of the pressing member 5 can be inserted to the insert space portion 2s of the base member 2 as shown in FIGS. 2(A) and 2(B). Several fitting chips 6 are formed at the upper part of the pressing member 5. The fitting chips 6 should be flared to the outside of the pressing member 5 and be flexible as shown in FIGS. 2(A) and 2(B).

When the upper end of the pressing member 5 is inserted into the insert space portion 2s of the base member 2, the fitting chips 6 hit on the inner surface of the upper portion 2b sporadically, as shown in FIGS. 1(A) and 2(A). Moreover, when the upper part of the pressing member 5 is taken out of the insert space portion 2s of the base member 2, each of the fitting chips 6 are flared outwardly of the case 1. The fitting chips 6 also touch/contact and engage with the lower end of the sliding circumferential wall 2a of the base member 2. Once the upper end of the pressing member 5 has been drawn from the insert space portion 2s ready to be pushed to the top of the case 1 by pressing the pressing member 5 as shown in FIG. 1(B) and FIG. 4(A), thus, projection 3 is ready to form a hole in the bottom portion 10 of the can receptacle C.

It should be now clear from the above description and the drawings that the device illustrated in, e.g., FIGS. 1(A) and 1(B) is of a non-returnable type. That is, the configuration shown in FIG. 1(A) is the configuration of the device prior to use while the configuration shown in FIG. 1(B) is the configuration of the device in use. When the device is configured as in FIG. 1(B) it will not go back to the configuration shown in FIG. 1(A) since the fitting chips 6 in, the flared state, engage with the lower end of the sliding circumferential wall 2a of the base member 2, as best seen in FIG. 1(B).

Next, a flange 5d is provided in the lower end of the pressing member 5, as shown in FIG. 4(B). The flange 5d is exposed at the bottom of the case 1. When the flange 5d is pushed to the upper part of the case 1, or when the flange 5d is hit strongly with a hammer or the like, the pressing member 5 is moved with the flange 5d. After that, the movement of the pressing member 5 causes a series of other movements, that is, a movement of the base member 2 and a movement of the hole-forming projection 3. As a result of the series of the movements, a hole is formed in the bottom portion 10 of the can receptacle C.

The flange 5d is placed approximately at the bottom of the case 1 such that the upper end of the pressing member 5 is fully inserted into the inserted space portion 2s of the base member 2. If the upper part of the pressing member 5 is taken out of the insert space portion 2s of the base member 2, as shown in FIG. 4(B), the flange 5d which is exposed at the bottom of the case 1 is separated from the lower end of the case 1.

Figure 5:
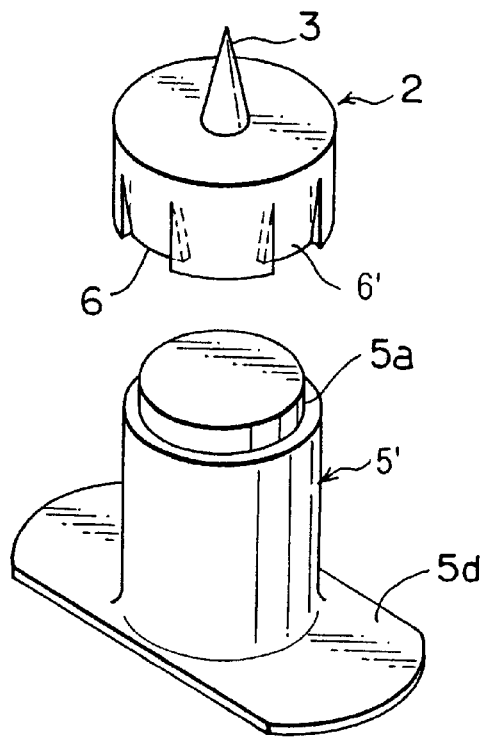
FIG. 5(A) is a perspective view showing only the main elements in the second modified first embodiment.
FIG. 5(B) is a longitudinal sectional side view showing a hole-forming device in normal condition in the second modified first embodiment.
Figure 5:
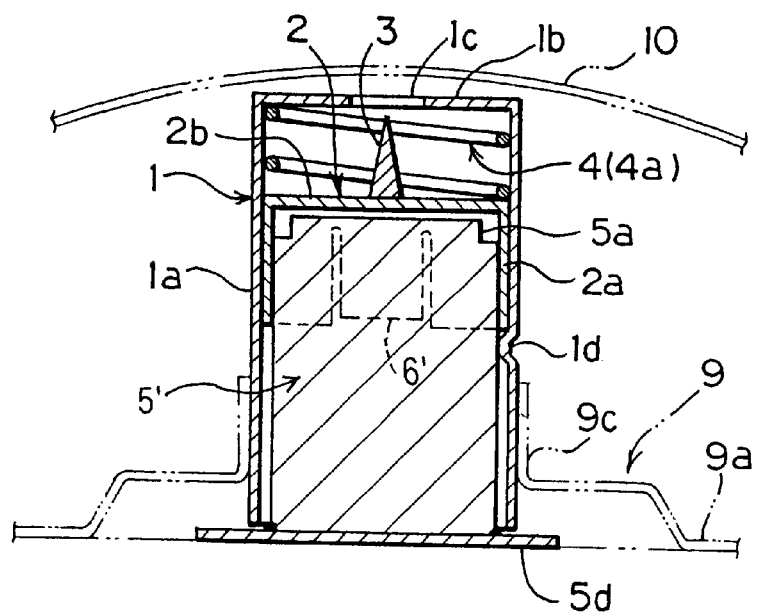

In a modification of the first embodiment of the present invention, the fitting chip 6' is modified to form the side wall of the base member 2 as shown in FIGS. 5(A) and 5(B). The fitting chip 6' is formed on the sliding circumferential wall 2a of the base member 2, as shown in FIG. 5(B). To be clear, line guiding groove portions are made on the sliding circumferential portion 2a. Accordingly, the fitting chip 6' is formed to be flexible to the inside of the base member 2 by way of the line guiding groove portions.

Further, a fitted step portion 5a can be formed at the upper end of the pressing member 5' so that the diameter of the fitted step portion 5a is slightly smaller the fitting chip 6' of the base member 2 to engage pressing member 5'. Even in this embodiment, the fitted step portion 5a of the pressing member 5' can be normally inserted into the insert space portion 2s of the base member 2.

Figure 6:
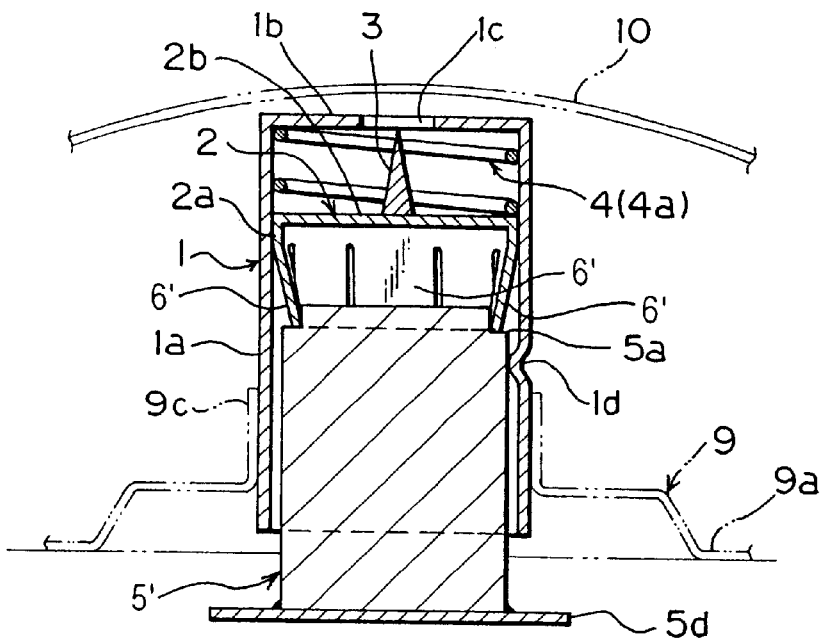
FIG. 6 is a longitudinal sectional side view of a hole-forming device in the second modified first embodiment ready for forming a hole in a can.

In FIG. 6, the fitting chips 6' of the base member 2 shrivel flexibly to the inside when the pressing member 5' is taken out of the insert space portion 2s of the base member 2. Then, the fitting chips 6' grab the fitted step portion 5a and the tips of the fitting chips 6', touch and engage with the fitted step portion 5a. Thus, the pressing member 5' is ready to push up the base member 2 to the upper part of the case 1 base member 2 from falling away from the case 1, as shown in FIG. 4(A), when the fitting chips 6 are pulled out of the insert space portion 2s. The base supporting portion 1d is formed as a small protruding portion that protrudes slightly from the circumferential wall 1a of the case 1 to the inside. With reference to FIGS. 2(A) and 2(B), the base supporting portion 1d easily supports the base member 2 member 85e.

A guide projection $82a_1$ is be formed on the sliding circumferential wall 82a of the base member 82. The guide projection $82a_1$ is inserted into a guide hole 81e formed on a circumferential wall 81a of the case 81. With guide projection $82a_1$, inserted in guide hole 81e, the base member 82 moves up and down inside the case 81 without rotating. Further, a pressing portion 84, for example a coiled spring 84a, a stopping projection or the like, is provided between the top portion 81b of the case 81 and the upper surface 82b of the base member 82.

Figure 8:
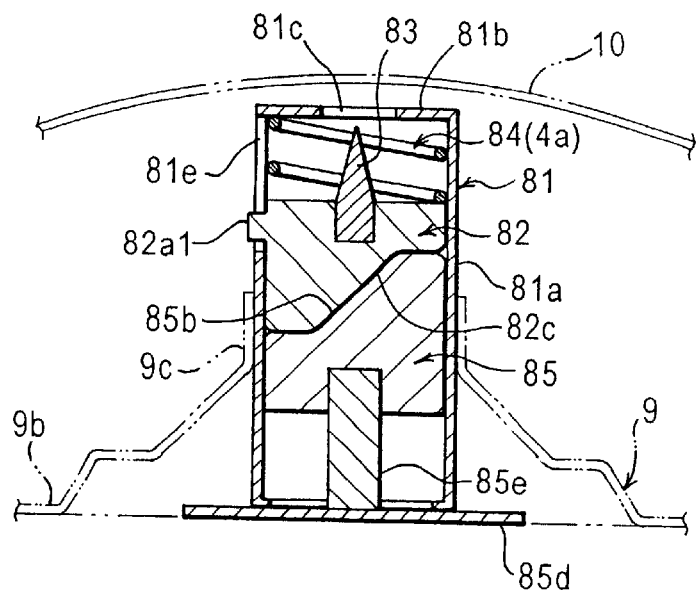
FIG. 8(A) is a longitudinal sectional side view of a hole-forming device in the second embodiment.
FIG. 8(B) is a partially cutaway perspective view of main elements of a hole-forming device in the second embodiment.
Figure 8:
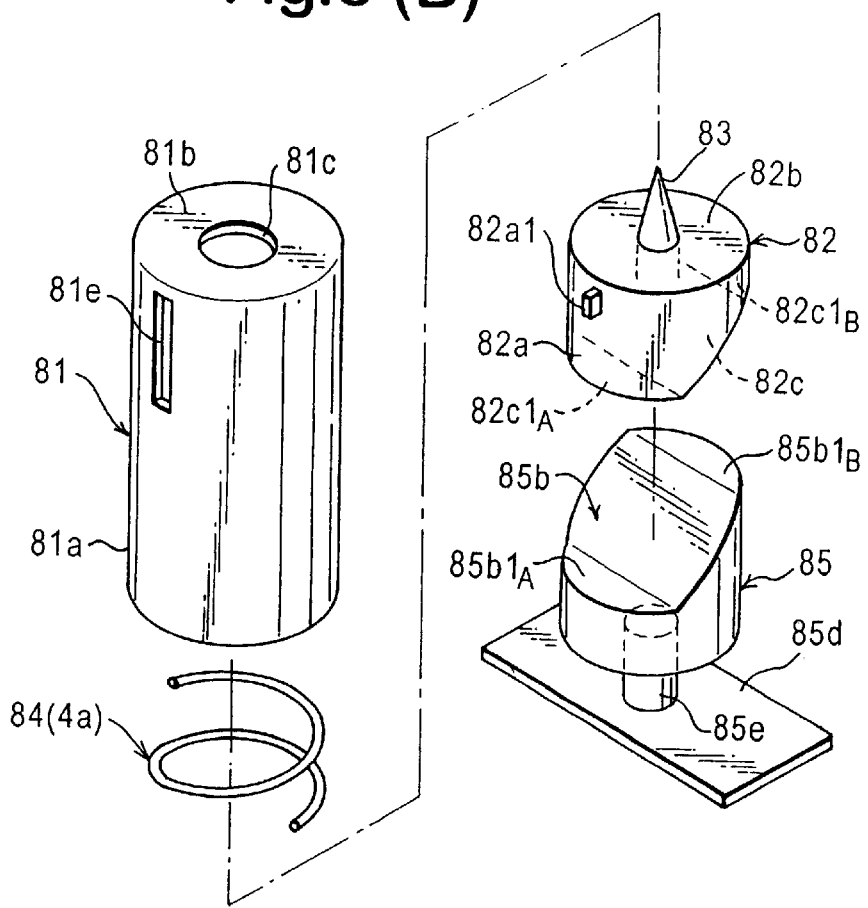
Figure 9:
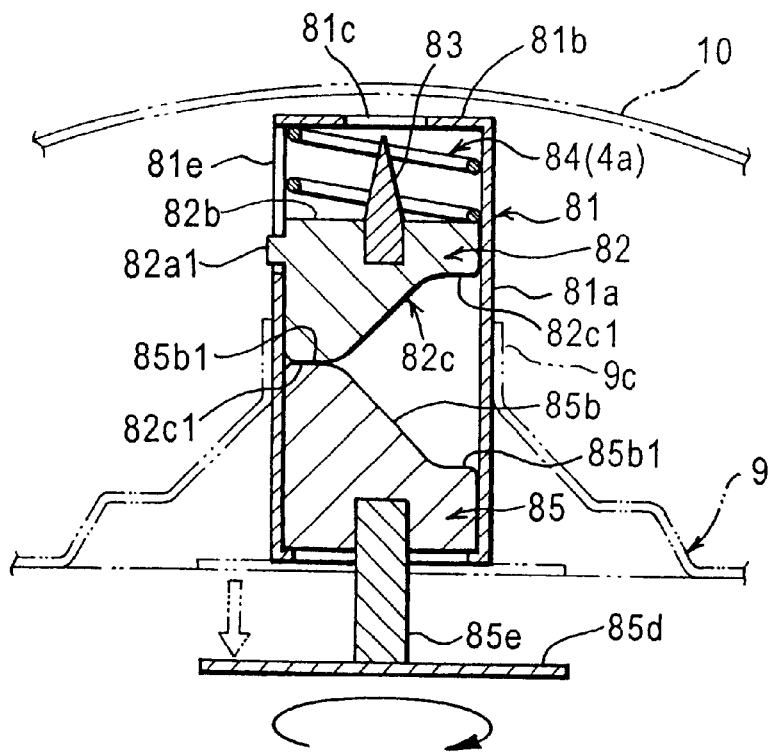
FIG. 9(A) is a longitudinal sectional side view of a hole-forming device in the second embodiment ready for forming a hole in a can.
FIG. 9(B) is a longitudinal sectional side view of a hole-forming device in the second embodiment showing completed hole forming.
Figure 9:
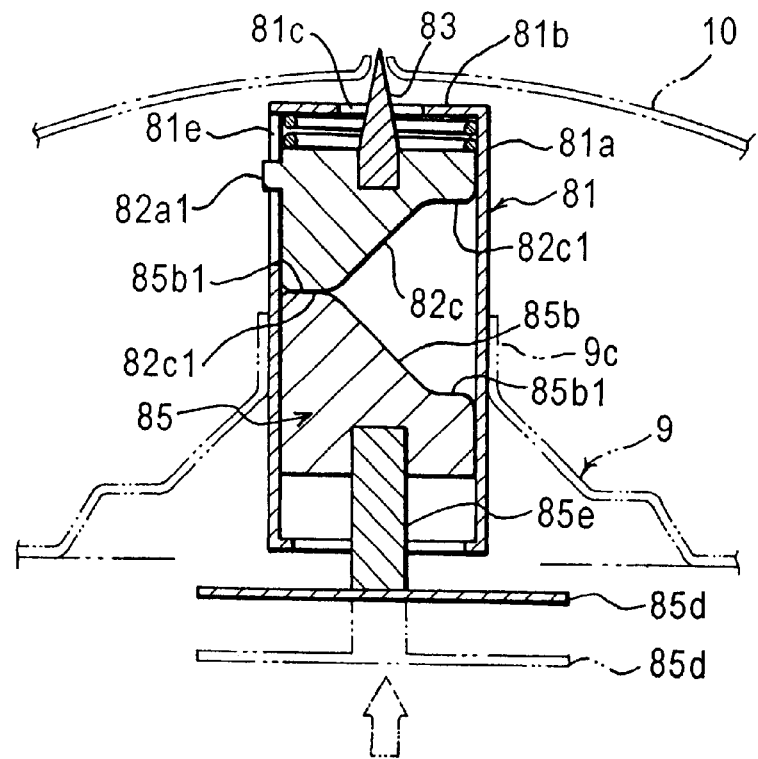
Figure 10:
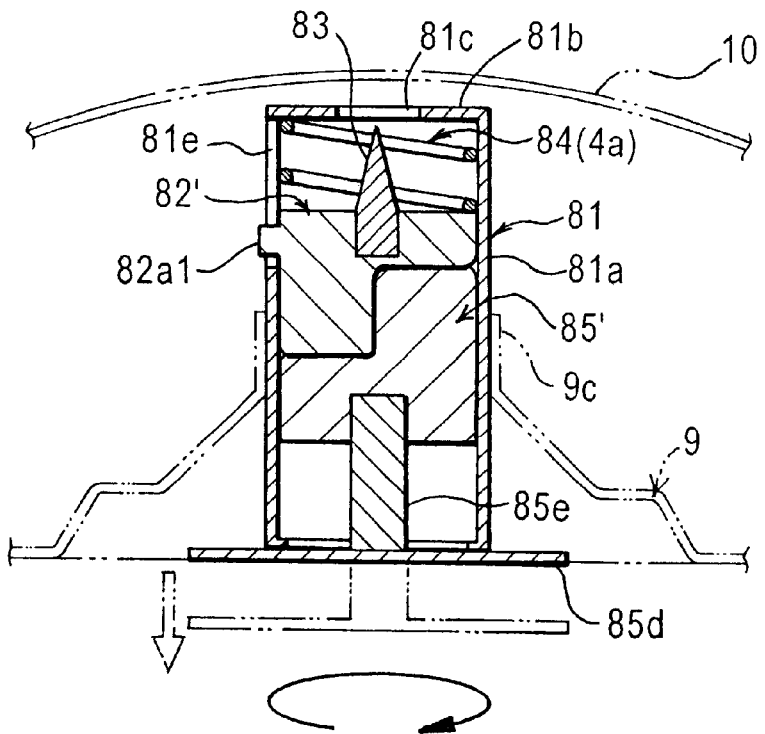
FIG. 10(A) is a longitudinal sectional side view of the second modified second embodiment.
FIG. 10(B) is a perspective view showing only the main elements of the second modified second embodiment.
Figure 10:
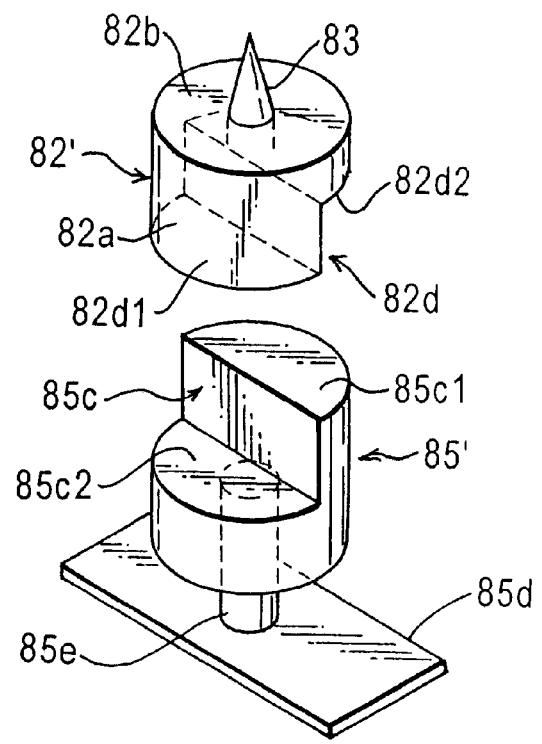

Referring to FIG. 8(A), the pressing member 85 rotates freely circumferentially in the case 81. Normally, the pressured slope 82c of the base member 82 and the pressing slope 85b of the pressing member 85 keep touching to each other. Referring to FIG. 9(A), when the pressing member 85 is rotated in the circumferential direction, both of the two slopes come to be apart since the base member 82 is not rotatable. Then, the flat surfaces $82c_{1A}$ and $82c_{1B}$ in the protrusion side come in contact with the flat surfaces $85b_{1A}$ and $85b_{1B}$.

Thus, as shown in FIG. 9(B), the distance from the upper end of the base member 82 to the lower end of the pressing member 85 (including the flange 85d) is lengthened second embodiment of the present invention, the lower end of the base member 82' can be modified to a pressured stepped surface 82d, which comprises of a lower portion $82d_1$, and an upper portion $82d_2$. In the same way, the upper end of the pressing member 85' can be modified to a pressing stepped surface 85c, which comprises of an upper portion $85c_1$ and a lower portion $85c_2$. Normally, the pressured stepped surface 82d and the pressing stepped surface 85c are engaged. In order to perform hole forming in the bottom of the can receptacle C, the pressing member 85' should be taken out of the lower end of the case 81 by way of the flange 85d with a circumferential rotation.

The engagement of the pressured stepped surface 82d and the pressing member 85' is released, and the portions $85c_1$ and $82d_1$ touch each other. Therefore, the distance from the top surface 82b of the base member 82' to the lower end of the pressing member 85' is lengthened embodiment of the present invention is shown. In FIG. 12(A), the convex portion $82d_1'$ of the pressured stepped surface 82d' of the base member 82a is located in the center of base member 82a. The stepped surface 82d' further includes upper steps $82d'_2$. The concave portion $85c'_2$ of the pressing stepped surface 85c' is located in the center of the pressing member 85a, adjacent to upper steps 85c'. Further, in FIG. 12(B), the convex portion $82d''_1$ of the pressured stepped surface 82d'' of the base member 82b is formed on both sides of the center part. Convex portion $85c''_1$ of the pressing stepped surface of the pressing member 85b is located in the center of pressing member 85b.

As in the first embodiment of the present invention, referring to FIG. 3(A), a fitting side of the present invention is fit to the bottom portion 10 of the can receptacle C. The upper end of the pressing member 5 is pulled out of the sliding circumferential wall 2a of the base member 2 (or the lower end of the case 1) by way of the flange 5d as shown in FIGS. 4(A) and 4(B). Thus, the fitting chip 6 of the pressing member 5 engages with the lower end of the base member 2. Then, the total length from the upper end of the base member 2 to the lower end of the pressing member 5 becomes longer, and the base member 2 is set for being moved up to the upper part of the case 1 by the pressing member 5. Further, referring to FIGS. 3(A)–(C), pressing the flange 5d against the bottom portion 10 of can receptacle C causes the hole-forming projection 3 to come out of the upper end of the case 1. As a result, a hole is formed in the bottom portion 10 of can receptacle C.

Next, as in the second embodiment of the present invention (FIGS. 8(A) and 8(B)), rotating the flange 85d causes the pressing member 85 to rotate in the case 81. Then, the pressing slope 85b also rotates and this rotation causes the pressing slope 85b of the pressing member 85 to push up (or press) the pressured slope 82c of the base member 82. As a result, referring to FIGS. 9(A) and 9(B), the total length consisting of the base member 82 and the pressing member 85 becomes longer.

Accordingly, pressing, pushing, or hitting strongly the flange 85d causes the hole-forming projection 83 to come out of the upper end of the case 81, which forms a hole in the bottom portion 10 of the can receptacle C. Likewise, rotating the flange 85d with pulling it out of the lower end of the case 81 enables the hole-forming in the bottom portion 10 of the can receptacle C.

In the invention, a base member 2 has a hole-forming projection 3. The hole-forming projection 3 is formed on an upper surface of the base member 2. The pressing member 5 is placed under the base member 2. A case 1 accommodates both the base member 2 and the pressing member 5 therein. In addition, the base member 2 is slidable upward to the upper part of the case 1 by pushing the pressing member 5 a part of which is taken out of the lower end of the case 1.

This configuration provides, various advantages, including, first, that it is possible to perform hole-forming operation with ease and safety.

More specifically, pulling out the pressing member 5 from the lower end of the case 1 by way of the flange 5d completes preparation for forming a hole. With the pulled-out pressing member 5 pushing (pressing) the base member 2 upward to the upper part of the case 1, the hole-forming projection 3 is projected from the upper end of the case 1 by adding a pressure or a strong hit to the pressing member 5. This provides an easy and a safety operation for hole forming in the bottom portion 10 of the can receptacle C.

Next, the invention provides a hole-forming device including a case 1 fittable to a bottom portion 10 of a can receptacle C. A base member 2 is accommodated in the case 1. The base member 2 is slidable along the longitudinal direction of said case 1. A hole-forming projection 3 is formed on an upper surface of the base member 2. A pressing portion 5 fixes roughly the base member 2 so that the hole-forming projection 3 is normally accommodated in the case 1. A pressing member 5 is placed under the base member 2. The upper end of the pressing member 5 is inserted in a lower part of the base member 2. A fitting chip 6 are formed at least in either the base member 2 or the pressing member 5. In addition, the base member 2 is engaged with the pressing member 5 a part of which is taken out of the base member 2. The base member 2 is slidable upward to the upper part of the case 1 by pushing the pressing member 5. This configuration provides, various advantages, including, first, that it is possible to make the structure of the hole-forming device simpler, and to perform hole forming in the bottom of cans without fail.

More specifically, when the pressing member 5 is taken (pulled) out of the lower end of the case 1 by way of the flange 5d, the point of the pressing member 5 inserted to the base member 2 comes apart from the base member 2. At the same time, the fitting chip 6 opens to the outside and the fitting chips 6 come in contact and engage with the lower end of the base member 2.

Thus, the total length. from the upper end of the base member 2 to the lower end of the pressing member 5 gets longer. The pressing member 5 pushes the base member 2 up and, therefore, the hole-forming projection 3 comes out of the upper end of the case 1. This provides an easy operation to prepare for hole forming in the bottom portion 10 of the can receptacle C. In addition, pressing the pressing member 5 by way of the flange 5d or hitting strongly the flange 5d with a hammer or the like, causes projection of the hole-forming projection 3 out of the upper end of the case 1. This also provides an easy operation to prepare for hole forming in the bottom portion 10 of the can receptacle C.

Next, the present invention provides a hole-forming device including a case 1 fittable to a bottom portion of a can receptacle. A base member 2 is accommodated in the case 1. The base member 2 is slidable along the longitudinal direction of the case 1. A hole-forming projection 3 is formed on an upper surface of said base member 2. A pressing portion 4 fixes roughly the base member 2 so that the hole-forming projection 3 is normally accommodated in the case. A pressing member 5 is placed under the base member 2. An upper end of the pressing member 5 is inserted in a lower part of the base member 2. A fitting chip 6 is formed in the upper end of the pressing member 5, and protrudes to the outside elastically, and whereby the base member 2 is engaged with the pressing member 5 a part of which is taken out of the base member 2. The base member 2 is slidable upward to the upper part of the case 1 by pushing the pressing member 5.

This configuration provides various advantages, including making it possible to perform the hole forming operation with more stability when the base member 2 is moved upward to the upper part of the case 1 by pressing (pushing) the pressing member 5. More specifically, the fitting chip 6 contacts elastically with the inner surface of the case 1. Then, the fitting chips 6 engage with the lower end of the base member 2. Thus, the engagement between the fitting chips 6 and the lower end of the base member 2 becomes more tight, performing hole forming operation with more stability.

Next, the present invention provides a hole-forming device including a case 81 fittable to a bottom portion 10 of a can receptacle C. The base member 82 is accommodated in the case 81. The base member 82 is slidable along the longitudinal direction of the case 81. A hole-forming projection 83 is formed on an upper surface of the base member 82. The pressing portion 84 fixes roughly and movably the base member 82 so that the hole-forming projection 83 is normally accommodated in the case 81. The pressing member 85 is placed under the base member 82. The base member has a pressured slope 82c as a lower end surface thereof. The pressing member 85 has a pressing slope 85b as an upper end surface thereof. The pressing slope 85b contacts with the pressured slope 82c. A lower part of the pressing member 85 is protruded from the lower end of the case 81 by circumferential rotation of the pressing member 85.

This configuration provides various advantages, including making it possible to prepare for hole forming operation with more ease by only rotating the pressing member 85 by way of the flange 85d. In addition, it is also possible to make the structure of the hole-forming device much simpler by forming the base member 82 and the pressing member 85 to be a cylindrical block. Further, any materials such as metals, synthetic resin and the like can be used for the disclosed hole-forming device.

Next, the present invention provides a hole-forming device including the case 81 fittable to a bottom portion 10 of the can receptacle C. The base member 82' is accommodated in the case 81. The base member 82' is slidable along the longitudinal direction of the case 81. The hole-forming projection 83 is formed on the upper surface of the base member 82'. The pressing portion 84 fixes roughly and movably the base member 82' so that the hole-forming projection 83 is normally accommodated in the case 81. The pressing member 85' is placed under the base member 82'. The base member 82' has a pressured stepped surface 82d. The pressing member 85' has a pressing stepped surface 85c. The pressing stepped surface 85c contacts with the pressured stepped surface 82d. The lower part of the pressing member 85' protrudes from the lower end of the case 81 by circumferential rotation of the pressing member 85'.

This configuration provides various advantages, including making it possible to prepare for hole forming operation with more ease by only taking (pulling) out of the pressing member 5 with a rotation.

Next, the present invention provides a hole-forming device including a coiled spring 4a [instead of the pressing portion 4].

This configuration provides various advantages, including making it possible to hold (keep) the hole-forming projection 3 inside the case 1 so as not to protrude it from the case 1 for the purpose of safety. Also, it is possible to reduce the shock at the time of hole forming by the elasticity of the coiled spring 4a. Further, it is possible to make the structure of the present invention much simpler because it is enough for performing hole forming to accommodate the coiled spring 4a in the case 1.

What is claimed is:

1. A hole-forming device, comprising:

a tubular case having an opening at an upper end thereof;

a base member accommodated in and slidable axially of said case, said base member including axially spaced upper and lower surfaces;

a piercing projection formed on the upper surface of said base member, and sized so as to pass through the opening of said case; and a pressing member having an engaging portion received within said case, movable between upper and lower axial positions, and adapted to be engaged with the lower surface of said base member in the lower axial position;

wherein said engaging portion is in a unengaged state when said engaging portion is in the upper axial position without engaging the lower surface of said base member, and is switched to an engaged state by a first movement of said engaging portion from the upper axial position to the lower axial position to engage the lower surface of said base member, whereby a second movement of said engaging portion from the lower axial position to the upper axial position, without disengaging said engaging portion from the lower surface of said base member, pushes said base member toward the upper end of said case with said piercing projection passing through the opening of said case; and said engaging portion includes a plurality of fitting chips flared radially outwardly.

2. The device of claim 1, wherein said base member comprises a plate portion supporting said piercing projection and defining the upper surface; and a circumferential wall extending from the plate portion toward the lower end of said case and ending at the lower surface;

wherein the fitting chips are restrained within the circumferential wall of said base member when said engaging portion is in the unengaged state, and engage the lower surface of said base member when said engaging portion is in the engaged state.

3. The device of claim 1 further comprising a stop element formed on a circumferential wall of said case for preventing said base member from completely falling off said case.

4. The device of claim 1, wherein said pressing member further comprises a flange element supporting said engaging portion and adapted to abut against a lower end of said case, the abutment of said flange element against the lower end of said case defining the upper axial position of said engaging portion.

5. The device of claim 1, wherein the upper end of said case comprises a flange for retaining the base member within said case when said piercing projection passes through the opening of said case.

6. The device of claim 1, further comprising a retaining member placed in said case between the upper end of said case and the upper surface of said base member for preventing said piercing projection from projecting beyond the opening of said case when said engaging portion is in the unengaged state.

7. The device of claim 6, wherein said retaining member includes a coiled spring.

* * * * *